(12) United States Patent
Sy

(10) Patent No.: US 6,961,685 B2
(45) Date of Patent: Nov. 1, 2005

(54) PROBABILITY MODEL SELECTION USING INFORMATION-THEORETIC OPTIMIZATION CRITERION

(76) Inventor: Bon K. Sy, 28-38 211th St., Bayside, NY (US) 11360

( * ) Notice: Subject to any disclaimer, the term of this patent is extended or adjusted under 35 U.S.C. 154(b) by 640 days.

(21) Appl. No.: 09/956,593

(22) Filed: Sep. 19, 2001

(65) Prior Publication Data
US 2002/0111780 A1 Aug. 15, 2002

Related U.S. Application Data

(60) Provisional application No. 60/233,569, filed on Sep. 19, 2000.
(51) Int. Cl.$^7$ ............................................. G06F 17/10
(52) U.S. Cl. ............................................. 703/2; 705/7
(58) Field of Search .................. 703/2; 705/7; 706/19; 700/2

(56) References Cited

U.S. PATENT DOCUMENTS 6,067,520 A * 5/2000 Lee .............................. 704/270
6,304,833 B1 * 10/2001 Ferkinhoff et al. ............. 703/2
6,353,679 B1 * 3/2002 Cham et al. ................ 382/228

* cited by examiner

*Primary Examiner*—Albert W. Paladini
(74) *Attorney, Agent, or Firm*—Keusey, Tutunjian & Bitetto, P.C.; Susan Paik, Esq.

(57) ABSTRACT

A system and method for the discovery and selection of an optimal probability model. Probability model selection can be formulated as an optimization problem with linear order constraints and a non-linear objective function. In one aspect, an algorithm that employs an information-theoretic based approach is used in which a scalable combinatoric search is utilized as defined by an initial solution and null vectors. The theoretical development of the algorithm has led to a property that can be interpreted semantically as the weight of evidence in information theory.

23 Claims, 2 Drawing Sheets

PROBABILITY MODEL SELECTION USING INFORMATION-THEORETIC OPTIMIZATION CRITERION

The present application claims priority from U.S. Provisional Application Ser. No. 60/233,569 entitled, "Probability Model Selection Using Information-Theoretic Optimization Criterion," filed on Sep. 19, 2000.

BACKGROUND OF THE INVENTION

1. Technical Field

The present invention relates generally to computer processing and more specifically, to a system and method for discovery and selection of an optimal probability model.

2. Description of the Related Art

Probability models with discrete random variables are often used for probabilistic inference and decision support. A fundamental issue lies in the choice and the validity of the probability model.

In statistics, model selection based on information-theoretic criteria can be dated back to early 1970's when the Akaike Information Criterion (AIC) was introduced (Akaike, H., (1973), "Information Theory and an Extension of the Maximum Likelihood Principle," in Proceedings of the 2nd International Symposium of Information Theory, eds. B. N. Petrov and E. Csaki, Budapest: Akademiai Kiado, pp. 267–281). Since then, various information criteria have been introduced for statistical analysis. For example, Schwarz information criterion (SIC) (Schwarz, C., (1978), "Estimating the Dimension of a Model," The Annals of Statistics, 6, pp. 461–464) was introduced to take into account the maximum likelihood estimate of the model, the number of free parameters in the model, and the sample size. SIC has been further studied by Chen and Gupta (Chen, J. and Gupta, A. K., "Testing and Locating Variance Change Points with Application to Stock Prices," Journal of the American Statistical Association, V.92 (438), Americal Statistical Association, June 1997, pp. 739–747; Gupta, A. K. and Chen, J. (1996), "Detecting Changes of Mean in Multidimensional Normal Sequences with APplications to Literature and Geology,": Computational Statistics, 11:211–221, 1996, Physica-Verlag, Heidelberg) for testing and locating change points in mean and variance of multivariate statistical models with independent random variables. Chen further elaborated SIC to change point problem for regular models. Potential applications on using information criterion for model selection to fields such as environmental statistics and financial statistics are also discussed elsewhere.

To date, studies in information criteria for model selection have focused on statistical models with continuous random variables, and in many cases, with the assumption of iid (independent and identically distributed).

In decision science, the utility of a decision support model may be evaluated based on the amount of biased information. Let's assume we have a set of simple financial decision models. Each model manifests an oversimplified relationship among strategy, risk, and return as three interrelated discrete binary-valued random variables. The purpose of these models is to assist an investor in choosing the type of an investment portfolio based on an individual's investment objective; e.g., a decision could be whether one should construct a portfolio in which resource allocation is diversified. Let's assume one's investment objective is to have a moderate return with relatively low risk. Suppose if a model returns an equal preference on strategies to, or not to, diversify, it may not be too useful to assist an investor in making a decision. On the other hand, a model that is biased towards one strategy over the other may be more informative to assist one in making a decision—even the decision does not have to be the correct one. For example, a model may choose to bias towards a strategy based on probability assessment on strategy conditioned on risk and return.

In the operations research community, techniques for solving various optimization problems have been discussed extensively. Simplex and Karmarkar algorithms (Borgwardt K. H., 1987, "The Simplex Method, A Probabilistic Analysis," Springer-Verlag, Berlin; Karmarkar, N., 1984, "A New Polynomial-time Algorithm for Linear Programming," Combinatorica 4 (4), pp. 373–395) are two methods that are constantly being used, and are robust for solving many linear optimization problems. Wright (Wright, S., 1997, "Primal-Dual Interior Point Methods, SIAM, ISBN 0-89871-382-X) has written an excellent textbook on primal-dual formulation for the interior point method with different variants of search methods for solving non-linear optimization problems. It was discussed in Wright's book that the primal-dual interior point method is robust on searching optimal solutions for problems that satisfy KKT conditions with a second order objective function.

At first glance, it seems that existing optimization techniques can be readily applied to solve a probability model selection problem. Unfortunately, there are subtle difficulties that make probability model selection a more challenging optimization problem. First of all, each model parameter in the optimization problem is a joint probability term bounded between 0 and 1. This essentially limits the polytope of the solution space to be much smaller in comparison to a non-probability based optimization problem with identical set of non-trivial constraints (i.e., those constraints other than $1 \geq P_i \geq 0$).

In addition, the choice of robust optimization methodologies is relatively limited for objective functions with a non-linear log property; e.g., an objective function based on Shannon Information Criterion (Shannon, C. E., and Weaver, W., The Mathematical Theory of Communication. University of Urbana Press, Urbana, 1972). Primal-dual interior point is one of the few promising techniques for the probability model selection problem. However, unfortunately the primal-dual interior point method requires the existence of an initial solution, and an iterative process to solve an algebraic system for estimating incrementally revised errors between a current sub-optimal solution and the estimated global optimal solution. This raises two problems. First, the primal-dual formulation requires a natural augmentation of the size of the algebraic system to be solved, even if the augmented matrix happens to be a sparse matrix. Since the polytope of the solution space is "shrunk" by the trivial constraints $1 \geq P_i \geq 0$, solving the augmented algebraic system in successive iterations to estimate incremental revised errors is not always possible. Another even more fundamental problem is that the convergence of the iterations in primal-dual interior point method relies on the KKT conditions. Such conditions may not even exist in many practical model selection problems.

Accordingly, an efficient and accurate technique for selecting an optimal probability model, while avoiding the limitations and problems of existing optimization technologies, is highly desirable.

SUMMARY OF THE INVENTION

The present invention is directed to a system and method for efficient probability model selection. Advantageously, an interior search of a solution space is based on iteratively changing the linear combination of solution vectors with null vectors (i.e., vectors mapping to zero), via a matrix defining the algebraic problem. Essentially, alternative solutions can be repeatedly derived using already-available information from previously-run algorithms, thus eliminating additional computation costs of entirely new algebra system equations.

In one aspect of the present invention, a method for selecting a probability model is provided comprising the steps of: computing an initial solution for a primal formulation of an optimization problem; identifying null vectors in a matrix of the primal formulation; obtaining multiple solutions by constructing a linear combination of the initial solution with the null vectors; and determining a local optimal model.

These and other aspects, features, and advantages of the present invention will be described or become apparent from the following detailed description of the preferred embodiments, which is to be read in connection with the accompanying drawings.

DETAILED DESCRIPTION OF PREFERRED EMBODIMENTS

Figure 1:
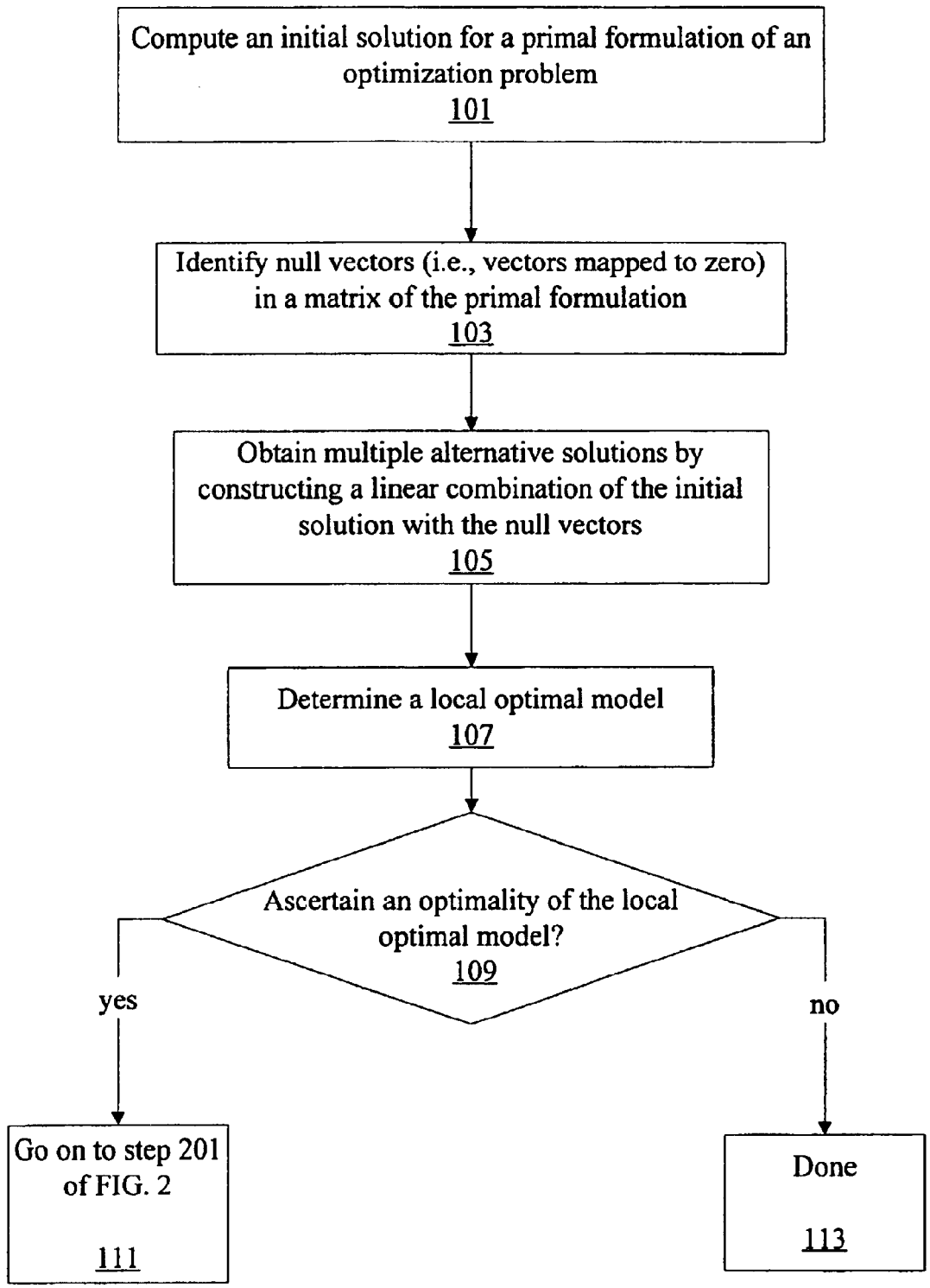
FIG. 1 is an exemplary flow diagram depicting a method for determining a local optimal probability model according to an aspect of the present invention.

It is to be understood that the exemplary system modules and method steps described herein may be implemented in various forms of hardware, software, firmware, special purpose processors, or a combination thereof. Preferably, the present invention is implemented in software as an application program tangibly embodied on one or more program storage devices. The application program may be executed by any machine, device or platform comprising suitable architecture. It is to be further understood that, because some of the constituent system modules and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate or practice these and similar implementations or configurations of the present invention.

The focus of the present invention is on probability models with discrete random variables. While the application of the statistical models discussed in the prior art is mainly for statistical inference based on statistic hypothesis test, the application of probability models is for probabilistic inference. The context of probabilistic inference could range, for example, from probability assessment of an event outcome to identifying the most probable events, or from testing independence among random variables to identifying event patterns of significant event association.

In information theory, the amount of biased probability information can be measured, for example, by means of expected Shannon entropy defined as $-\Sigma_i P_i \log P_i$. Let $(\Omega, \Im, P)$ be a given probability model; where $\Omega$ is the sample space, $\Im$ is a $\sigma$-field of sets each of which is a subset of $\Omega$, and $P(E)$ is the probability of an event $E \in \Im$. A linear (in)equality constraint on a probability model can be defined as, for example, a linear combination of the joint probabilities P's in a model. The model selection problem discussed in the present invention can be formally formulated, for example, as follows:

Let $M = \{M_i : (\Omega, \Im, P) \mid i=1, 2, \ldots\}$ be a set of probability models where all models share an identical set of primitive events defined as the supremum (the least upper bound) taken over all partition of $\Omega$. Let $C = \{C_i : i=1, 2, \ldots\}$ be a set of linear (in)equality constraints defined over the joint probability of primitive events. Within the space of all probability models bounded by C, the problem of probability model selection is to find the model that maximizes expected Shannon entropy.

It can be shown that the problem of model selection described above is actually an optimization problem with linear order constraints defined over the joint probability terms of a model, and a non-linear objective function (defined by $-\Sigma_i P_i \log P_i$). It is important to note an interesting property of the model selection problem just described:

Property 1: Principle of Minimum Information Criterion—An optimal probability model is one that minimizes bias, in terms of expected entropy, in probability assessments that depend on unknown information, while it preserves known biased probability information specified as constraints in C.

To overcome the prior art problems, an optimization algorithm taking a hybrid approach has been developed according to an aspect of the present invention. This optimization algorithm follows the spirit of the primal-dual interior point method, but deviates from the traditional approach in its search technique towards an optimal solution.

I. Optimization Algorithm for Probability Model Selection

FIG. 1 illustrates an exemplary flow diagram of a method for determining a probability model according to an aspect of the present invention. Initially, in step 101, an initial solution is computed for a primal formulation of an optimization problem. The primal formulation, or algebraic system equations, can be defined, for example, by the probability constraint set in the form of $A\underline{x}=\underline{b}$; i.e., each constraint in C accounts for a row in matrix A, and is linear combination of joint probability terms, with proper slack variable introduced when necessary.

A typical scenario in probability model selection is expert testimony or valuable information obtained from data analysis expressed in terms of probability constraints. For example, consider the following case (Example A) where one is interested in an optimal probability model with two binary-valued random variables:

EXAMPLE A $\{X_1:0, 1\}, \{X_2:0, 1\},$ and $P_0 = Pr(X_1:0, X_2:0),$ $P_1 = Pr(X_1:0, X_2:1), P_2 = Pr(X_1:1, X_2:0), P_3 = Pr(X_1:1, X_2:1),$ Give expert testimony as follows:

$P(x_1:0) \leq 0.65 \Leftrightarrow P_0 + P_1 + S = 0.65\ \exists S \geq 0$ $P(x_2:0) = 0.52 \Leftrightarrow P_0 + P_2 = 0.52$ $\Sigma_i P_i = 1.0 \Leftrightarrow P_0 + P_1 + P_2 + P_3 = 1.0$ Its primal formulation is shown below:

$$\begin{bmatrix} 11001 \\ 10100 \\ 11110 \end{bmatrix} \begin{bmatrix} P_0 \\ P_1 \\ P_2 \\ P_3 \\ S \end{bmatrix} = \begin{bmatrix} 0.65 \\ 0.52 \\ 1.00 \end{bmatrix} \Leftrightarrow A\underline{x} = \underline{b}$$

In general, a probability model with n probability terms, v inequality constraints, and w equality constraints will result in a constraint matrix A with size (v+w)(n+v). In the example just shown, n=4, v=1, and w=2.

A feasible solution is preferably obtained for the primal formulation using any available existing solutions, or for example, by any of the numerical methods proposed by Kuenzi, Tzschach, and Zehnder (Kuenzi H. P., Tzschach H. G., and Zehnder C. A., 1971, "Numerical Methods of Mathematical Optimization," New York, Academic Press). Another feasible solution is preferably obtained by applying, for example, the Singular Value Decomposition (SVD) algorithm. Then, the initial solution $\underline{x}$ is determined by comparing all the available feasible solutions and choosing the best one (i.e., the solution which maximizes, for example, expected Shannon entropy).

The basic idea of the Kuenzi, Tzschach, and Zehnder approach for solving an algebraic system of linear constraints is to reformulate the constraint set by introducing (v+w) variables—one for each constraint. Using the above example, $Z_0 = 0.65 - P_0 - P_1 - S$ $Z_1 = 0.52 - P_0 + P_2$ $Z_2 = 1.0 - P_0 - P_1 - P_2 - P_3$, $Z_0 \geq 0$ $Z_1 \geq 0$ $Z_2 \geq 0$ $S \geq 0$ $P_0 \geq 0$ $P_1 \geq 0$ $P_2 \geq 0$ $P_3 \geq 0$ The above (in)equalities can be thought of as a constraint set of yet another optimization problem with a cost function Min[$Z_0+Z_1+Z_2$]. Note that a feasible solution of this new optimization problem is a vector of seven parameters [$Z_0$ $Z_1$ $Z_2$ $P_0$ $P_1$ $P_2$ $P_3$]. If the global minimum can be achieved in this new optimization problem, this is equivalent to $Z_0=Z_1=Z_2=0$, which in turn gives a feasible solution for the original problem. That is, $P_i$s in the global optimal solution [0 0 0 $P_0$ $P_1$ $P_2$ $P_3$ S] is a feasible solution of the original problem.

In addition to the Kuenzi, Tzschach, and Zehnder approach for solving the algebraic system of linear constraints, Singular Value decomposition (SVD) algorithm can also be applied to obtain another feasible solution. The basic concept of SVD of matrix A is to express A in the form of $UDV^T$. A is a (v+w) by (n+v) matrix. U is a (v+w) by (n+v) orthonormal matrix satisfying $U^TU=I$, where I is an identity matrix. D is a diagonal matrix with a size of (n+v) by (n+v). V transpose ($V^T$) is a (n+v) by (n+v) orthonormal matrix satisfying $V V^T=I$.

It can be shown a solution to $A\underline{x}=\underline{b}$ is simply, for example, $\underline{x}=VD^{-1}U^T\underline{b}$; where $D^{-1}D=I$. Note that $D^{-1}$ can be easily constructed from D by taking the reciprocal of non-zero diagonal entries of D while replicating the diagonal entry from D if an entry in D is zero.

Next, vectors that correspond to zero entries (i.e,. null vectors or vectors mapped to zero in a matrix of the primal formulation) are identified (step 103). For example, column vectors $\{V_i \mid i=1,2 \ldots \}$ from, for example, the by-product of the SVD that correspond to the zero entries in, for example, the diagonal matrix of the SVD of A, are identified.

In other words, the null column vectors have the property of mapping the null vectors to a null space via the matrix defining the problem (i.e., $AV_i=\emptyset$; where $V_i$ is a null vector). These null column vectors are referred to as null vectors hereinafter. It is to be noted that the null column vectors can be obtained by methods such as those for solving eigen-vector/eigen-values, or, in an embodiment of the present invention, from the by-product of SVD that corresponds to the zero entries in the diagonal matrix of the SVD of A.

It can be shown that, for example, whenever there is a zero diagonal entry $d_{i,i}=0$ in D of SVD, a linear combination of a solution vector $\underline{x}$ with the corresponding $i^{th}$ column vector of V is also a solution to $A\underline{x}=\underline{b}$. This is because such a column vector of V actually is mapped to a null space through the transformation matrix A; i.e., $AV_i=0$.

This enables a search of the optimal probability model along the direction of the linear combination of the initial solution vector and the column vectors of V with the corresponding diagonal entry in D equal to zero.

In step 105, multiple alternative solutions are obtained by constructing a linear combination of the initial solution with the null vectors. For example, multiple alternative solutions $\underline{y}$ are obtained by constructing the linear combination of the initial solution $\underline{x}$ with the $V_i$; i.e., $A\underline{y}=\underline{b}$ where $\underline{y}=\underline{x}+\Sigma_i a_i V_i$ for some constants $a_i$.

An exemplary local optimal solution of the example discussed in Example A above that minimizes $\Sigma_i P_i \log P_i$ (or maximizes $-\Sigma_i P_i \log P_i$) is shown below:

$\underline{x}=[P_0 \, P_1 \, P_2 \, P_3]^T=[0.2975 \, 0.24 \, 0.2225 \, 0.24]^T$ with $\Sigma_i P_i \log_e P_i = -1.380067$ It is to be noted that two different approaches (instead of just, for example, SVD) are preferably used to obtain an initial feasible solution according to an aspect of the present invention, despite the fact that SVD, for example, generates an initial solution as well as the necessary information for deriving multiple solutions in a search for an optimal solution. It is to be noted that the initial feasible solution defines the region of the search space the search path traverses. Advantageously, using two different approaches to obtain an initial feasible solution improves the chance of searching in the space where the global optimal solution resides. Further, although SVD is a robust and efficient algorithm for solving linear algebra, the trivial non-negative constraints ($P_i \geq 0$) are difficult to include in the formulation required for applying SVD. As a consequence, a solution obtained from applying, for example, only SVD, albeit satisfying all non-trivial constraints, may not satisfy the trivial constraints.

As discussed above, the mechanism for generating multiple solutions is based on $A\underline{y}=\underline{b}$ where $\underline{y}=\underline{x}+\Sigma_i a_i V_i$ for some constants $a_i$. It is known that SVD may fail to generate a feasible solution that satisfies both trivial and non-trivial constraints. When this happens, however, one can still apply the same mechanism for generating multiple solutions using the feasible solution obtained from, for example, any of the numerical methods of Kuenzi, Tzschach, and Zehnder.

Next, in step 107 a local optimal model is found through a linear search along the vectors that are mapped to the null space (for example, in the SVD process). The local optimal model is the model which optimizes a chosen objective function. One of the forms of objective functions used to illustrate the present invention is the Shannon information entropy defined by $-\Sigma_i P_i \log P_i$. The local optimal model $\underline{x}$ is a model selected from the multiple alternative solutions found in step 105 which optimizes the value of a chosen objective function. In other words, the local optimal model is $\underline{x}=[P_1 \ldots P_n]^T$, where $-\Sigma_i P_i \log P_i$ of $\underline{x}$ is the largest among all the multiple alternative solution models found in step 105. In the case, for example, of maximum Shannon information entropy as an objective function, the local optimal solution is one that minimizes $\underline{c}^T\underline{x}$, where $\underline{c}=[\log P_1 \ldots \log P_n]^T$.

If it is desired to ascertain the optimality of the local optimal model (step 109), then the system goes on to step 201 of FIG. 2 below. Otherwise, the system is done (step 113).

Figure 2:
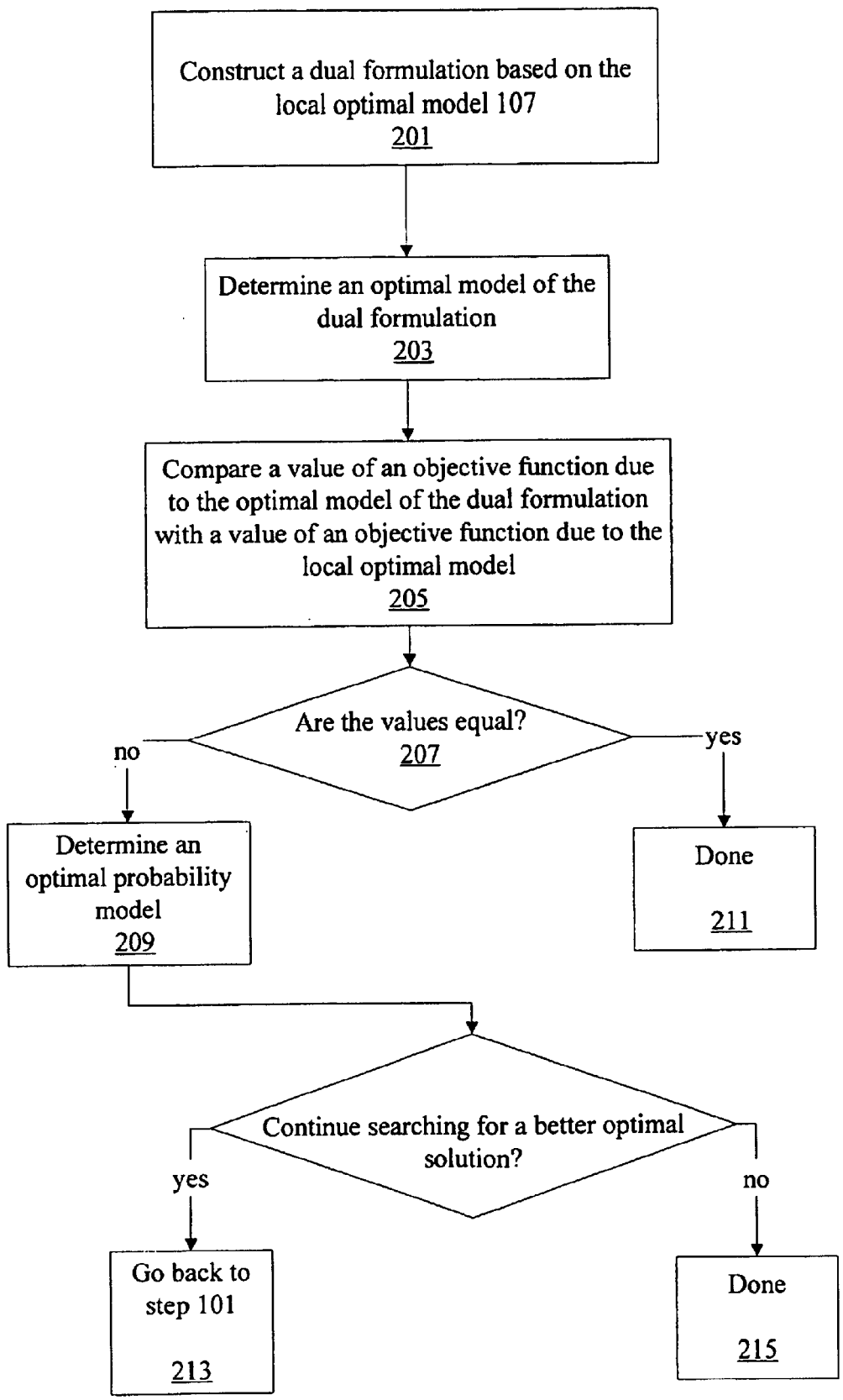
FIG. 2 is an exemplary flow diagram depicting a method for determining an optimal probability model according to an aspect of the present invention.

FIG. 2 illustrates an exemplary flow diagram depicting a method for determining an optimal probability model according to an aspect of the present invention. Initially, in step 201 a dual formulation is constructed based on the log of the local optimal model determined in step 107. For example, a dual formulation in the form of $A^T\underline{\lambda}\leq\underline{c}$ can be constructed.

Next, an optimal model of the dual formulation is determined (step 203) by solving for $\underline{\lambda}$ using, for example, SVD subject to maximizing an objective function. The objective function is defined by the linear combination of the constant vector of the primal formulation and the solution of the dual formulation and mathematically has the form, for example, of: $\underline{b}^T\underline{\lambda}$; where $\underline{\lambda}=[\log p_1 \ldots \log p_n]^T$. (Note that $\underline{c}$ is the log of the initial solution (the local optimal model) obtained in step 107). This objective function $\underline{b}^T\underline{\lambda}$ can be shown, with a few steps of derivation, as an estimate of an upper bound of the optimality of the local optimal model of step 107.

Basically, to avoid getting trapped in the local plateau, the present invention conducts an optimization in the log space that corresponds to the dual part of the model selection problem formulation. Specifically, the constant vector for the algebraic system of the dual part can be constructed using the local optimal solution obtained in step 107; i.e.,

EXAMPLE B:

$$\begin{bmatrix} 1 & 1 & 1 & 1 & 0 & 0 & 0 \\ 1 & 0 & 1 & 0 & 1 & 0 & 0 \\ 0 & 1 & 1 & 0 & 0 & 1 & 0 \\ 1 & 0 & 1 & 0 & 0 & 0 & 1 \end{bmatrix} \begin{bmatrix} X_0 \\ X_1 \\ X_2 \\ S_0 \\ S_1 \\ S_2 \\ S_3 \end{bmatrix} = \begin{bmatrix} \log 0.2975 \\ \log 0.24 \\ \log 0.2225 \\ \log 0.24 \end{bmatrix} \Leftrightarrow A^T\underline{\lambda}\leq\underline{c}$$

subject to maximizing $\underline{b}^T\lambda$;

where $\underline{c}^T = [\log 0.2975 \log 0.24 \log 0.2225 \log 0.2]$ $\underline{b}^T = [0.65\ 0.52\ 1.0]$ Note that the column corresponding to the slack variables (i.e., the last column in A of the primal formulation corresponding to the variable(s) S) is preferably dropped in the dual formulation since it does not contribute useful information to estimating the optimal bound of the solution. In addition, the optimization problem defined in this dual part comprises linear order constraints and a linear objective function.

However, certain issues exist in solving the dual part. It is not sufficient just to apply SVD to solve for $A^T\underline{\lambda}\leq\underline{c}$ because a legitimate solution requires non-negative values of $S_i$ (i=0,1,2,3) in the solution vector of $\underline{\lambda}$. In the above Example B, although there are four equations, there are only three variables that can span over the entire range of real numbers. The remaining four slack variables can only span over the non-negative range of real numbers. It is not guaranteed there will always be a solution for the dual part even though there is a local optimal solution found in the above Example B. For example, the local optimal solution is listed below:

$\underline{\lambda}^T=[0.331614\ 0.108837\ -2.320123]$ where (maximal) $\underline{b}^T\underline{\lambda}=-2.047979$ Next, in step 205, a value of an objective function (for example, $\underline{b}^T\underline{\lambda}$) due to the global optimal model is compared with the value of the objective function (for example, $\underline{c}^T\underline{x}$) due to the local optimal model. Then, it is preferably determined if the values are equal (step 207). It is to be noted that the optimal value of the objective function $\underline{b}^T\underline{\lambda}$ is an estimate of the optimality of the solution obtained in the primal formulation. When $\underline{c}^T\underline{x}=\underline{b}^T\underline{\lambda}$, then the local optimal model $\underline{x}$ is also the global optimal probability model with respect to maximum expected entropy. Thus, if the values are equal (e.g., when $\underline{c}^T\underline{x}=\underline{b}^T\underline{\lambda}$) the best optimal solution has been found and the system is done (step 211).

However, it is often the case where $\underline{c}^T\underline{x}\geq\underline{b}^T\underline{\lambda}$ when there is a stable solution for the dual part. This can be proved easily with few steps of derivation similar to that of the standard primal-dual formulation for optimizations described in (Wright 1997). In this case (where, for example, the values are not equal) we can formulate yet another optimization problem to conduct a search on the optimal solution. In step 209, an optimal probability model is determined by formulating and solving such another optimization problem. This can be done, for example, by solving the optimization problem with one constraint defined as $\underline{x}^T$ Log $\underline{x}'=\underline{b}^T\underline{\lambda}$, with an objective function defined as Min$|1-\Sigma_i P'_i|$ where Log $\underline{x}'=[\log P'_1 \ldots \log P'_n]^T$, where $\underline{x}$ is the optimal solution vector obtained in the step 107. If $\underline{x}'$ satisfies all axioms of probability theory, the optimal probability model to be selected in step 209 is $\underline{x}'$. Otherwise, the optimal probability model to be selected is $\underline{x}$.

If it is desired by the user, for example, to continue searching for a better optimal solution (i.e., a model closer to the boundaries determined in FIG. 2), the user can go back to step 101 and reformulate the problem to try to determine a better optimal model. Otherwise, the system is done (step 215).

Note that $\underline{\lambda}$ is related to the log probability terms, thus the solution Log $\underline{x}'$ represents a log probability model. The concept behind $\underline{x}^T$ Log $\underline{x}'=\underline{b}^T\underline{\lambda}$ is to try to get a probability model that has a weighted information measure equal to the estimated global value $\underline{b}^T\underline{\lambda}$. This involves the following property:

Property 2: The constraint $\underline{x}^T\underline{x}'=\underline{b}^T\underline{\lambda}$ defines a similarity measure identical to the weight of evidence in comparing two models.

To understand property 2, let's consider the case $\underline{c}^T\underline{x}\approx\underline{b}^T\underline{\lambda}$, $\underline{x}^T$ Log $\underline{x}'=\underline{b}^T\underline{\lambda}$ becomes $\underline{x}^T$ Log $\underline{x}'=\underline{x}^T\underline{c}$, or $\underline{x}^T(\underline{c}-\text{Log }\underline{x}')=0$. $\underline{x}^T(\underline{c}-\text{Log }\underline{x}')=0$ is equivalent to $\Sigma_i P_i \log P_i/P'_i=0$, which has a semantic interpretation in information theory that two models are identical based on the weight of evidence measurement function.

It is to be noted that the optimization in step 209 is a search in log space, but not necessarily in log probability space since the boundary for the probability space is defined in the objective function, rather than in the constraint set. As a consequence, a solution from step 209 does not necessarily correspond to a legitimate candidate for the probability model selection.

It is to be noted that the present invention is preferably implemented through a time-based software licensing approach as described in co-pending U.S. patent application Ser. No. 60/252,668 filed provisionally on Nov. 22, 2000, entitled "Time-Based Software Licensing Approach," which is commonly assigned and the disclosure of which is hereby incorporated by reference in its entirety.

In the implementation of an optimization algorithm according to the present invention, the application also has a feature to support probability inference using multiple models. The limitation is that each query should be expressed as a linear combination of the joint probability terms. A probability interval will be estimated for each query.

II. A Practical Example Using a Real World Problem

Synthetic molecules may be classified as musk-like or not musk-like. A molecule is classified as musk-like if it has certain chemical binding properties. The chemical binding properties of a molecule depend on its spatial conformation. The spatial conformation of a molecule can be represented by distance measurements between the center of the molecule and its surface along certain rays. This distance measurements can be characterized by 165 attributes of continuous variables.

A common task in "musk" analysis is to determine whether a given molecule has a spatial conformation that falls into the musk-like category. Our recent study discovers that it is possible to use only six discretized variables (together with an additional flag) to accomplish the task satisfactory (with a performance index ranging from 80% to 91% with an average 88%).

Prior to the model selection process, there is a process of pattern analysis for selecting the seven variables out of the 165 attributes and for discretizing the selected variables. Based on the "musk" data set available elsewhere with 6598 records of 165 attributes, six variables are identified and discretized into binary-valued variables according to the mean values. These six variables, referred to as V1 to V6, are from the columns 38, 126, 128, 134, 137, and 165 in the data file mentioned elsewhere (Murphy 1994). Each of these six random variables takes on two possible values {0, 1}. V7 is introduced to represent a flag. V7:0 indicates an identified pattern is part of a spatial conformation that falls into the musk category, while V7:1 indicates otherwise. Below is a list of 14 patterns of variable instantiation identified during the process of pattern analysis and their corresponding probabilities:

TABLE 1

Illustration of Event Patterns as Constraints for Probability Model Selection

| V1 | V2 | V3 | V4 | V5 | V6 | V7 | Pr(V1, V2, V3, V4, V5, V6, V7) |
|---|---|---|---|---|---|---|---|
| 0 | 0 | 0 | 0 | 0 | 0 | 0 | $P_0 = 0.03698$ |
| 0 | 0 | 0 | 0 | 0 | 0 | 1 | $P_1 = 0.0565$ |
| 0 | 0 | 0 | 0 | 0 | 1 | 1 | $P_3 = 0.0008$ |
| 0 | 0 | 0 | 0 | 1 | 0 | 0 | $P_4 = 0.0202$ |
| 0 | 0 | 0 | 0 | 1 | 0 | 1 | $P_5 = 0.0155$ |
| 0 | 0 | 0 | 0 | 1 | 1 | 1 | $P_7 = 0.0029$ |

TABLE 1-continued

Illustration of Event Patterns as Constraints for Probability Model Selection

| V1 | V2 | V3 | V4 | V5 | V6 | V7 | Pr(V1, V2, V3, V4, V5, V6, V7) |
|---|---|---|---|---|---|---|---|
| 0 | 0 | 0 | 1 | 0 | 0 | 1 | $P_9 = 0.00197$ |
| 0 | 0 | 1 | 1 | 1 | 1 | 0 | $P_{30} = 0.0003$ |
| 0 | 1 | 0 | 0 | 0 | 0 | 0 | $P_{32} = 0.00697$ |
| 0 | 1 | 0 | 0 | 0 | 0 | 1 | $P_{33} = 0.00318$ |
| 0 | 1 | 0 | 0 | 0 | 1 | 1 | $P_{35} = 0.00136$ |
| 0 | 1 | 0 | 0 | 1 | 0 | 0 | $P_{36} = 0.00788$ |
| 0 | 1 | 0 | 0 | 1 | 0 | 1 | $P_{37} = 0.0026$ |
| 0 | 1 | 0 | 1 | 0 | 0 | 1 | $P_{41} = 0.0035$ |

Remark: The index i of $P_i$ in the table shown above corresponds to an integer value whose binary representation is the instantiation of the variables (V1 V2 V3 V4 V5 V6 V7).

A pattern of variable instantiation that is statistically significant may appear as part of the spatial conformation that exists in both the musk and the non-musk categories; for example, the first two rows in the above table. As a result, the spatial conformation of a molecule may be modeled using the probability and statistical information embedded in data to reveal the structure characteristics. One approach to represent the spatial conformation of a molecule is to develop a probability model that captures the probability information shown above, as well as the probability information shown below to preserve significant statistical information existed in data:

P(V1:0)=0.59 P(V2:0)=0.462 P(V3:0)=0.416
P(V4:0)=0.5215 P(V5:0)=0.42255

Note that a probability model of musk is defined by a joint probability distribution of 128 terms; i.e., $P_0 \ldots P_{127}$. In this example we have 20 constraints $C_0 \ldots C_{19}$; namely, $C_0$: $P_0$=0.03698  $C_1$: $P_1$=0.0565  $C_2$: $P_3$=0.0008  $C_3$: $P_4$=0.0202

$C_4$: $P_5$=0.0155  $C_5$: $P_7$=0.0029  $C_6$: $P_9$=0.00197  $C_7$: $P_{30}$=0.0003

$C_8$: $P_{32}$=0.00697  $C_9$: $P_{33}$=0.00318  $C_{10}$: $P_{35}$=0.00136  $C_{11}$: $P_{36}$=0.00788

$C_{12}$: $P_{37}$=0.0026  $C_{13}$: $P_{41}$=0.0035

$C_{14}$: P(V1:0)=$\Sigma_{V2,V3,V4,V5,V6,V7}$P(V1:0,V2,V3,V4,V5,V6,V7)=0.59

$C_{15}$: P(V2:0)=$\Sigma_{V1,V3,V4,V5,V6,V7}$P(V1,V2:0,V3,V4,V5,V6,V7)=0.462

$C_{16}$: P(V3:0)=$\Sigma_{V1,V2,V4,V5,V6,V7}$P(V1,V2,V3:0,V4,V5,V6,V7)=0.416

$C_{17}$: P(V4:0)=$\Sigma_{V1,V2,V3,V5,V6,V7}$P(V1,V2,V3,V4:0,V5,V6,V7)=0.5215

$C_{18}$: P(V5:0)=$\Sigma_{V1,V2,V3,V4,V6,V7}$P(V1,V2,V3,V4,V5:0,V6,V7)=0.42255

$C_{19}$: $\Sigma_{V1,V2,V3,V4,V5,V6,V7}$P(V1,V2,V3,V4,V5,V6,V7)=1.0

The optimal model identified by applying the algorithm discussed in this paper is shown below:

TABLE 2

A Local Optimal Probability Model of Musk

| | | | | | | | | |
|---|---|---|---|---|---|---|---|---|
| P0–P7: | 0.03698 | 0.0565 | 0.002036 | 0.0008 | 0.0202 | 0.0115 | 0.005729 | 0.0029 |
| P8–P15: | 0.003083 | 0.00197 | 0.003083 | 0.003083 | 0.006776 | 0.006776 | 0.006776 | 0.006776 |
| P16–P23: | 0.006269 | 0.006269 | 0.006269 | 0.006269 | 0.009963 | 0.009963 | 0.009963 | 0.009963 |
| P24–P31: | 0.007317 | 0.007317 | 0.007317 | 0.007317 | 0.01101 | 0.01101 | 0.0003 | 0.01101 |
| P32–P39: | 0.00697 | 0.00318 | 0.004879 | 0.00136 | 0.00788 | 0.0026 | 0.008572 | 0.008572 |

TABLE 2-continued

A Local Optimal Probability Model of Musk

| P40–P47:   | 0.005927 | 0.0035   | 0.005927 | 0.005927 | 0.00962  | 0.00962  | 0.00962  | 0.00962  |
|------------|----------|----------|----------|----------|----------|----------|----------|----------|
| P48–P55:   | 0.009113 | 0.009113 | 0.009113 | 0.009113 | 0.012806 | 0.012806 | 0.012806 | 0.012806 |
| P56–P63:   | 0.01016  | 0.01016  | 0.01016  | 0.01016  | 0.013854 | 0.013854 | 0.013854 | 0.013854 |
| P64–P71:   | 0.000497 | 0.000497 | 0.000497 | 0.000497 | 0.00419  | 0.00419  | 0.00419  | 0.00419  |
| P72–P79:   | 0.001545 | 0.001545 | 0.001545 | 0.001545 | 0.005238 | 0.005238 | 0.005238 | 0.005238 |
| P80–P87:   | 0.004731 | 0.004731 | 0.004731 | 0.004731 | 0.008424 | 0.008424 | 0.008424 | 0.008424 |
| P88–P95:   | 0.005779 | 0.005779 | 0.005779 | 0.005779 | 0.009472 | 0.009472 | 0.009472 | 0.009472 |
| P96–P103:  | 0.003341 | 0.003341 | 0.003341 | 0.003341 | 0.007034 | 0.007034 | 0.007034 | 0.007034 |
| P104–P111: | 0.004388 | 0.004388 | 0.004388 | 0.004388 | 0.008081 | 0.008081 | 0.008081 | 0.008081 |
| P112–P119: | 0.007575 | 0.007575 | 0.007575 | 0.007575 | 0.011268 | 0.011268 | 0.011268 | 0.011268 |
| P120–P127: | 0.008622 | 0.008622 | 0.008622 | 0.008622 | 0.012315 | 0.012315 | 0.012315 | 0.012315 |

Expected Shannon entropy=$-\Sigma_i P_i \text{Log}_2 P_i$=6.6792 bits

III. Evaluation Protocol Design

In this section the focus will be on a preliminary evaluation of an ActiveX application. The evaluation was conducted on an Intel Pentium 133 MHZ laptop with 32 M RAM and a hard disk of 420 M bytes working space. The laptop was equipped with an Internet Explorer 4.0 web browser with ActiveX enabled. In addition, the laptop also had installed S-PLUS 4.5 and an add-on commercial tool for numerical optimization NUOPT. The commercial optimizer NUOPT was used for comparative evaluation.

A total of 17 test cases, indexed as C1–C17 listed in Table 3 shown in the next section are derived from three sources for a comparative evaluation. The first source is the Hock and Schittkowski problem set (Hock, W., and Schittkowski, K., 1980, *Lecture Notes in Economics and Mathematical Systems* 187: *Test Examples for Nonlinear Programming Codes*, Beckmann M. and Kunzi H. P. Eds., Springer-Verlag, Berlin Heidelberg, New York), which is a test set also used by NUOPT for its benchmark testing. The second source is a set of test cases, which originated in real world problems. The third source is a set of randomly generated test cases.

Seven test cases (C1–C7) are derived from the first source—abbreviated as STC (Ci) (the ith Problem in the set of Standard Test Cases of the first source). Four test cases originated from real world problems in different disciplines such as analytical chemistry, medical diagnosis, sociology, and aviation. The remaining six test cases are randomly generated and abbreviated as RTCi (the ith Randomly generated Test Case).

The Hock and Schittkowski problem set is comprised of all kinds of optimization test cases classified by means of four attributes. The first attribute is the type of objective function such as linear, quadratic, or general objective functions. The second attribute is the type of constraint such as linear equality constraint, upper and lower bounds constraint etc. The third is the type of the problems whether they are regular or irregular. The fourth is the nature of the solution; i.e., whether the exact solution is known (so-called 'theoretical' problems), or the exact solution is not known (so-called 'practical' problems).

In the Hock and Schittkowski problem set, only those test cases with linear (in)equality constraints are applicable to the comparable evaluation. Unfortunately those test cases need two pre-processing steps; namely, normalization and normality. These two pre-processings are necessary because the variables in the original problems are not necessarily bounded between 0 and 1—an implicit assumption for terms in a probability model selection problem. Furthermore, all terms must be added to a unity in order to satisfy the normality property, which is an axiom of the probability theory.

The second source consists of four test cases. These four cases (C9, C10, C16 and C17) are originated from real world problems. The first case C9 is from census data analysis for studying social patterns. The second case C10 is from analytical chemistry for classifying whether a molecule is a musk-like. The third case C16 is from medical diagnoses. The last one is from aviation, illustrating a simple model of aerodynamics for single-engine pilot training.

In addition to the seven "benchmark" test cases and the four test cases from real world problems, six additional test cases (C8, C11–C15) are included for the comparative evaluation. These six cases, indexed by RTCi (the ith randomly generated test case), are generated based on a reverse engineering approach that guarantees knowledge of a solution. Note that all seven test cases from the Hock and Schittkowski problem set do not have to have a solution after the introduction of the normality constraint (i.e., all variables add up to one). Regarding the test cases originated from the real world problems, there is again no guarantee of the existence of solution(s). As a consequence, the inclusion of these six cases constitutes yet another test source that is important for the comparative evaluation.

IV. Preliminary Comparative Evaluation

The results of the comparative evaluation are summarized in Table 3 below. The first column in the table is the case index of a test case. The second column indicates the source of the test cases. The third column is the number of joint probability terms in a model selection problem. The fourth column is the number of non-trivial constraints. In general, the degree of difficulty in solving a model selection problem is proportional to the number of joint probability terms in a model and the number of constraints.

The fifth and the sixth columns are the expected Shannon entropy of the optimal model identified by the commercial tool NUOPT and the ActiveX application respectively. Recall the objective is to find a model that is least biased, thus of maximal entropy, with respect to unknown information while preserving the known information stipulated as constraints. Hence, a model with a greater entropy value is a better model in comparison to one with a smaller entropy value.

The seventh column reports the upper bound of the entropy of an optimal model. Two estimated maximum entropies are reported. The first estimate is derived based on the method discussed earlier (steps 6 and 7). The second estimate (in parenthesis) is the theoretical upper bound of the entropy of a model based on $\text{Log}_2 n$; where n is the number of probability terms ($3^{rd}$ column) in a model. Further details about the theoretical upper bound are referred to the report elsewhere (Shannon 1972).

The last column indicates whether an initial guess is provided for the prototype software to solve a test case. The prototype implementation allows a user to provide an initial guess before the algorithm is applied to solve a test case (e.g., C3b, C7b, C12b, C14b, and C15b). There could be cases where other tools may reach a local optimal solution that can be further improved. This feature provides flexibility to further improve a local optimal solution.

using the proposed dual formulation approach is less than satisfactory. In only three (marked with *) of the 15 solvable test cases the proposed dual formulation approach yields a better upper bound in comparison to the theoretical upper bound that does not consider the constraints of a test case. Furthermore, in only one of the three cases the estimated

TABLE 3

Comparative Evaluation Results

| Case | Source of test case/ Application Domain | # of terms | # of non-trivial constraints | NUOPT: entropy of optimal model | Prototype: entropy of optimal model | Entropy upper bound estimate | With initial guess |
|---|---|---|---|---|---|---|---|
| C1 | STC (P55) | 6 | 3 | 2.5475 | 2.55465 | 3.3 (2.58) | No |
| C2 | STC (P21) | 6 | 3 | 0.971 | 0.971 | *1.306 (2.58) | No |
| C3a | STC (P76) | 4 | 4 | 1.9839 | 0.9544 | 7.07 (2) | No |
| C3b | STC (P76) | | | | 1.9855 | — | Yes |
| C4 | STC (P86) | 5 | 8 | — | — | — | No |
| C5 | STC (P110) | 10 | 21 | — | — | — | No |
| C6 | STC (P112) chemical equilibrium | 10 | 4 | 3.2457 | 3.2442 | 3.966 (3.322) | No |
| C7a | STC (P119) | 16 | 9 | 3.498 | 2.7889 | -(4) | No |
| C7b | STC (P119) | | | | 3.4986 | -(4) | Yes |
| C8 | RTC1 | 4 | 3 | 1.9988 | 1.991 | 2.9546 (2) | No |
| C9 | Census Bureau/ sociology study | 12 | 10 | 2.8658 | 2.8656 | -(3.5849) | No |
| C10 | Chemical analysis (Ex. in section 6) | 128 | 20 | 6.6935 | 6.6792 | 23.633 (7) | No |
| C11 | RTC2 | 9 | 4 | 2.9936 | 2.9936 | 4.247 (3.167) | No |
| C12a | RTC3 | 4 | 3 | 1.328 | 0.85545 | *1.9687 (2) | No |
| C12b | RTC3 | | | | 1.328 | 6.242 (2) | Yes |
| C13 | RTC4 | 4 | 3 | 2 | 1.889 | 3.3589 (2) | No |
| C14a | RTC5 | 4 | 3 | 1.72355 | 0.971 | -(2) | No |
| C14b | RTC5 | | | | 1.72355 | 5.742 (2) | Yes |
| C15a | RTC6 | 4 | 3 | 1.96289 | 0.996 | -(2) | No |
| C15b | RTC6 | | | | 1.96289 | 6.09755 (2) | Yes |
| C16 | Medical diagnosis | 256 | 24 | 2.8658 | 3.37018 | 8.726 (8) | No |
| C17 | Single-engine pilot training model | 2187 | 10 | 10.13323 | 10.13357 | *11.0406 (11.0947) | No |

V. Discussion of Comparative Evaluation

As shown in Table 3, both the prototype implementation of the optimization algorithm according to the present invention and the commercial tool NUOPT solved 15 out of the 17 cases. Further investigation reveals that the remaining two test cases have no solution. For these 15 cases, both systems are capable of reaching optimal solutions similar to each other in most of the cases. In one case (C16) the ActiveX application reached a solution significantly better than NUOPT, while NUOPT reached a significantly better solution in four cases (C3, C12, C14, C15). It is to be noted that the ActiveX application actually improves the optimal solution of NUOPT in one of these four cases (C3) when the ActiveX application uses the optimal solution of NUOPT as an initial guess in an attempt to further improve the solutions of these problems.

Referring to the seventh column, the result of estimating the upper bound entropy value of the global optimal model upper bound derived by the dual formulation approach is significantly better than the theoretical upper bound. This suggests the utility of the dual formulation for estimating an upper bound is limited according to our test cases.

It should also be noted that the proposed dual formulation fails to produce an upper bound in three of the 15 solvable cases (C7, C14, and C15). This is due to the fact that the transpose of the original constraint set may turn slack variables in the primal formulation to variables in the dual formulation that have to be non-negative. However, the SVD cannot guarantee to find solutions that those variables are non-negative. When the solution derived using SVD contains negative values assigned to the slack variables, the dual formulation will fail to produce an estimate of the upper bound, which occurred three times in the 15 solvable test cases.

In the comparative evaluation, it was chosen not to report the quantitative comparison of the run time performance for two reasons. First, the prototype implementation allows a user to control the number of iterations indirectly through a parameter that defines the size of incremental step in the search direction of SVD similar to that of the interior point method. The current setting, for example, is 100 steps in the interval of possible bounds in the linear search direction of SVD. When the number of steps is reduced, the speed of reaching a local optimal solution increases. In other words, one can trade the quality of the local optimal solution for the speed in the ActiveX application. Furthermore, if one provides a "good" initial guess, one may be able to afford a large incremental step, which improves the speed, without much compromise on the quality of the solution. Therefore, a direct comparative evaluation on the run-time performance would not be appropriate.

The second reason not to have a direct comparative evaluation of the run-time is the need of re-formulating a test case using SIMPLE (System for Interactive Modeling and Programming Language Environment) before NUOPT can "understand" the problem, and hence solve it. Since NUOPT optimizes its run-time performance by dividing the workload of solving a problem into two steps, and only reports the elapsed time of the second step, it is not possible to establish an objective ground for a comparative evaluation on the run-time. Nevertheless, the ActiveX application solves all the test cases quite efficiently. As typical to any ActiveX deployment, a one-time download of the ActiveX application from the Internet is typically required.

VI. Conclusion

The present invention takes advantage of the by-product, for example, of the singular value decomposition to efficiently generate multiple solutions in search of an optimal probability model. Specifically, if a linear set of probability constraints is represented in a matrix form A, A can be decomposed into $U^T D V$ using singular value decomposition with U and V being normalized orthogonal matrices, and D being a diagonal matrix. If the ith diagonal entry of D is zero, then the ith column vector in V is a by-product of the singular value decomposition that is mapped to the null space through A. Such a column vector is referred to as a null vector. All null vectors, together with an initial solution, can be linearly combined to obtain multiple solutions through an iterative process to search for the optimal model.

The present invention advantageously utilizes a scalable combinatoric linear search as defined by the initial solution and the null vectors. The search is efficient because of its linearity, and the combinatorial possible combination of the null vectors with the initial solution for generating multiple solution models can be adjusted according to the computational resources available, as well as the proximity to the true global optimal model. It is to be noted that the "best" values on the choice of the number of the null vectors to be used are preferably one or two.

Along the linear search, an initial solution is obtained by solving the boundary conditions if an inequality probability constraint exists. The present invention includes a parameter (constant C) for determining the size of a "jump" step in the search. Specifically, C is a normalized value with, preferably, a best value of 4 for the size of the "jump" step, with an optimal normalization scalar that can be easily determined by maximal possible change allowed for each element of the initial feasible solution vector to stay within 0 and 1—a requirement for satisfying basic probability axioms.

The present invention, in addition to searching on the boundary as done by most existing technology such as that based on the Simplex method, also searches in the interior of the solution space as done, for example, by the interior point method. However, the interior search of the present invention is based on iteratively changing the value of the slack variables and repeatedly deriving alternative solutions using the already available information from, for example, singular value decomposition without additional computation costs of entirely new algebra system equations.

Moreover, it is to be noted that the present invention can utilize an initial solution obtained elsewhere through other methods besides those discussed in the present application; thus, the present invention can compliment other methods to potentially improve the quality of an optimal solution obtained elsewhere.

It is to be noted also that the method of the present invention can be applied to any model selection problem which provides linear order constraints and non-linear objective functions, and thus is not restricted to selecting probability models.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the present invention. All such changes and modifications are intended to be included within the scope of the invention as defined by the appended claims.

What is claimed is:

1. A method for selecting a probability model comprising the steps of:
   a) computing an initial solution for a primal formulation of an optimization problem, wherein said step of computing comprises obtaining a first solution using a method proposed by Kuenzi, Tzschach and Zehnder;
   obtaining a second solution using a Singular Value Decomposition algorithm;
   comparing said first and second solutions; and
   selecting as the initial solution either of the first or second solutions which optimizes a chosen objective function;
   b) identifying null vectors in a matrix derived from the Singular Value Decomposition algorithm;
   c) obtaining multiple alternative solutions by constructing a linear combination of the initial solution with the null vectors; and
   d) determining an optimal model of the primal formulation, wherein the step of determining the optimal model of the primal formulation comprises selecting a model from said multiple alternative solutions which optimizes the chosen objective function.

2. The method of claim 1, wherein if it is desired to ascertain an optimality of the optimal model of the primal formulation, further comprising the steps of:
   a) constructing a dual formulation based on the optimal model of the primal formulation;
   b) determining an optimal model of the dual formulation;
   c) comparing a value of an objective function of the optimal model of the dual formulation with a value of an objective function of the optimal model of the primal formulation, wherein if said values are unequal, further comprising the step of:
   d) formulating a new optimization problem by returning to step (a) of claim 2.

3. The method of claim 2, wherein if a user desires to search for a better optimal probability model, further comprising the step of returning to step (a) of claim 1.

17

4. The method of claim 2, wherein the dual formulation comprises the form:

$$A^T \underline{\lambda} \leq \underline{c}, \text{ where } \underline{\lambda} = [\log P_1 \ldots \log P_n]^T.$$

5. The method of claim 2, wherein said objective function of the optimal model of the dual formation comprises: $\underline{b}^T \underline{\lambda}$ where $\underline{\lambda} = [\log P_1 \ldots \log P_n]^T$.

6. The method of claim 2, wherein said objective function of the optimal model of the primal formulation comprises: $\underline{c}^T \underline{x}$, where $\underline{c} = [\log P_1 \ldots \log P_n]^T$.

7. The method of claim 2, wherein the step of formulating a new optimization problem includes solving said optimization problem with a constraint defined as: $\underline{x}^T \text{Log } \underline{x}' = \underline{b}^T \underline{\lambda}$, with an objective function defined as $\text{Min}|1 - \Sigma_i P'_i|$ where $\text{Log } \underline{x}' = [\text{Log } P'_1 \ldots \text{Log } P'_n]^T$, where $\underline{x}$ is an optimal solution vector obtained in step (d) of claim 1.

8. The method of claim 7, if $\underline{x}'$ satisfies predetermined criteria, the optimal probability model to be selected is $\underline{x}'$; otherwise, the optimal probability model to be selected is $\underline{x}$.

9. The method of claim 1, wherein the primal formulation comprises the form; $A\underline{x} = \underline{b}$.

10. The method of claim 1, wherein multiple alternative solutions $\underline{y}$ are obtained by constructing said linear combination of an initial solution $\underline{x}$ with null vectors $V_i$ such that:

$A\underline{y} = \underline{b}$, where $\underline{y} = \underline{x} + \Sigma_i a_i V_i$ for some constant $a_i$.

11. A program storage device readable by a machine, tangibly embodying a program of instructions executable by the machine to perform method steps for selecting a probability model, the method comprising the steps of:

a) computing an initial solution for a primal formulation of an optimization problem, wherein said step of computing comprises obtaining a first solution using a method proposed by Kuenzi, Tzschach and Zehnder;

obtaining a second solution using a Singular Value Decomposition algorithm;

comparing said first and second solutions; and selecting as the initial solution either of the first or second solutions which optimizes a chosen objective function;

b) identifying null vectors in a matrix derived from the Singular Value Decomposition algorithm;

c) obtaining multiple alternative solutions by constructing a linear combination of the initial solution with the null vectors; and d) determining an optimal model of the primal formulation, wherein the step of determining the optimal model of the primal formulation comprises selecting a model from said multiple alternative solutions which optimizes the chosen objective function.

12. The program storage device of claim 11, wherein if it is desired to ascertain an optimality of the optimal model of the primal formulation, further comprising the steps of:

a) constructing a dual formulation based on the optimal model of the primal formulation;

b) determining an optimal model of the dual formulation;

c) comparing a value of an objective function of the optimal model of the dual formulation with a value of an objective function of the optimal model of the primal formulation, wherein if said values are unequal, further comprising the step of:

d) formulating a new optimization problem by returning to step (a) of claim 12.

13. The program storage device of claim 12, wherein if a user desires to search for a better optimal probability model, further comprising the step of returning to step (a) of claim 1.

18

14. The program storage device of claim 12, wherein the dual formulation comprises the form;

$$A^T \underline{\lambda} \leq \underline{c}, \text{ where } \underline{\lambda} = [\log P_1 \ldots \log P_n]^T.$$

15. The program storage device of claim 12, wherein said objective function of the optimal model of the dual formulation comprises: $\underline{b}^T \underline{\lambda}$ where $\underline{\lambda} = [\log P_1 \ldots \log P_n]^T$.

16. The program storage device of claim 12, wherein said objective function of the optimal model of the primal formulation comprises: $\underline{c}^T \underline{x}$, where $\underline{c} = [\log P_1 \ldots \log P_n]^T$.

17. The method of claim 12, wherein the step of formulating a new optimization problem includes solving said optimization problem with a constraint defined as: $\underline{x}^T \text{Log } \underline{x}' = \underline{b}^T \underline{\lambda}$, with an objective function defined as $\text{Min}|1 - \Sigma_i P'_i|$ where $\text{Log } \underline{x}' = [\text{Log } P'_1 \ldots \text{Log } P'_n]^T$, where $\underline{x}$ is an optimal solution vector obtained in step (d) of claim 11.

18. The method of claim 17, wherein if $\underline{x}'$ satisfies predetermined criteria, the optimal probability model to be selected is $\underline{x}'$; otherwise, the optimal probability model to be selected is $\underline{x}$.

19. The program storage device of claim 11, wherein the primal formulation comprises the form: $A\underline{x} = \underline{b}$.

20. The program storage device of claim 11, wherein multiple alternative solutions $\underline{y}$ are obtained by constructing said linear combination of an initial solution $\underline{x}$ with null vectors $V_i$ such that:

$A\underline{y} = \underline{b}$, where $\underline{y} = \underline{x} + \Sigma_i a_i V_i$ for some constant $a_i$.

21. A method for selecting a probability model comprising the steps of:

a) constructing a primal formulation of the form $A\underline{x} = \underline{b}$ for algebraic system equations defined by a constraint set;

b) computing an initial solution $\underline{x}$ for the primal formulation, wherein said step of computing comprises:

obtaining a first solution using a method proposed by Kuenzi, Tzschach and Zehnder;

obtaining a second solution using a Singular Value Decomposition (SVD) algorithm;

comparing said first and second solutions; and selecting as the initial solution $\underline{x}'$ either of the first or second solutions which optimizes a chosen objective function;

c) identifying column vectors $\{V_1 | i=1, 2, \ldots\}$ in a matrix derived from the Singular Value Decomposition algorithm that correspond to zero entries in a diagonal matrix of the SVD of A;

d) obtaining multiple alternative solutions $\underline{y}$ by constructing a linear combination of the initial solution $\underline{x}$ with the vectors $V_i$; and e) identifying an optimal model of the primal formulation $\underline{x} = [P_1, \ldots P_n]^T$, wherein the step of identifying the optimal model of the primal formulation comprises determining $-\Sigma_i P_i \log P_i$ of $\underline{x}$ of each of said multiple alternative solutions $\underline{y}$ and selecting the largest result of said multiple alternative solutions.

22. The method of claim 21, wherein if it is desired to ascertain an optimality of the optimal model of the primal formulation, further comprising the steps of:

formulating a new optimization problem by constructing a dual formulation $A^T \underline{\lambda} \leq \underline{c}$ based on the optimal model of the primal formulation and solving $\underline{\lambda}$ using the SVD subject to maximizing $\underline{b}^T \underline{\lambda}$, where $\underline{\lambda} = [\log P_1 \ldots \log P_n]^T$;

comparing an estimated value of $\underline{b}^T \underline{\lambda}$ with $\underline{c}^T \underline{x}$ of the optimal model of the primal formulation;

solving the optimization problem with one constraint: $\underline{x}^T \text{Log } \underline{x}' = \underline{b}^T \underline{\lambda}$ subject to $\text{Min}|1 - \Sigma_i P'_i|$ where $\text{Log } \underline{x}' = [\text{Log } P'_1, \ldots, \text{Log } P'_n]^T$; and selecting $\underline{x}'$ as the optimal probability model if $\underline{x}'$ satisfies predetermined criteria, otherwise selecting $\underline{x}$ as the optimal probability model.

23. The method of claim 22, wherein $\underline{b}^T \underline{\lambda}$ is a cost value of an optimal model of the dual formulation and an estimated value for the optimal model of the primal formulation.

* * * * *